A. E. MOORHEAD.
VALVE MECHANISM FOR PUMPS.
APPLICATION FILED MAY 6, 1909.
988,945.
Patented Apr. 4, 1911.
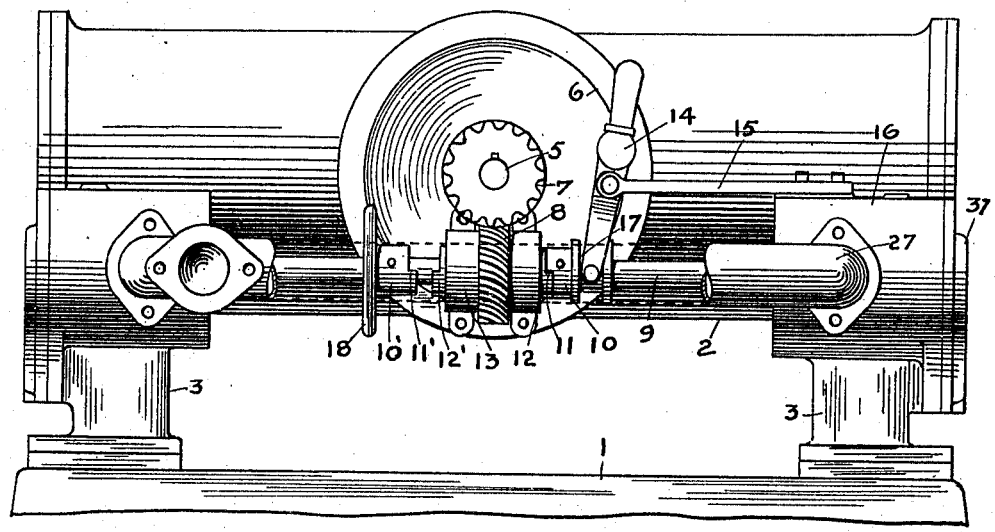
FIG. 1
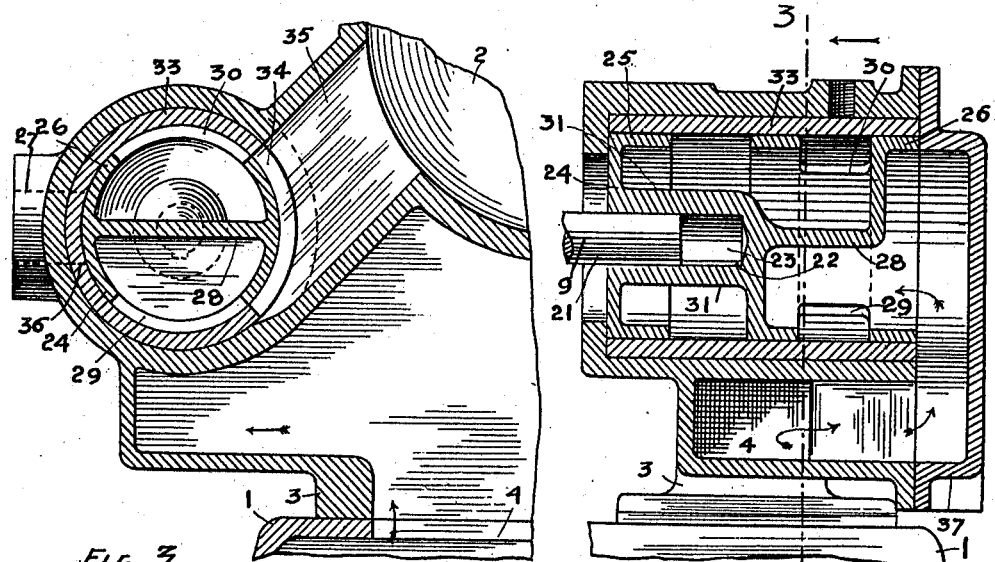
FIG. 3
FIG. 2
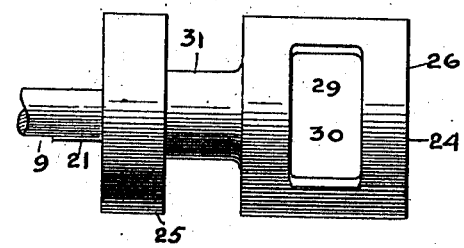
FIG. 4
WITNESSES:
Nellie D. Keating.
Leon Bolloc
INVENTOR:
A. E. Moorhead
By F. M. Wright
Attorney.

UNITED STATES PATENT OFFICE.

ALBERT E. MOORHEAD, OF SAN FRANCISCO, CALIFORNIA.

VALVE MECHANISM FOR PUMPS.

988,945.

Specification of Letters Patent.

Patented Apr. 4, 1911.

Application filed May 6, 1909. Serial No. 494,275.

*To all whom it may concern:*

Be it known that I, ALBERT E. MOORHEAD, a citizen of the United States, residing at San Francisco, in the county of San Francisco and State of California, have invented new and useful Improvements in Valve Mechanism for Pumps, of which the following is a specification.

The object of the present invention is to provide an improved valve especially adapted for use in double ended pumping engines, such as form part of pneumatic cleaning apparatus used for office buildings, and the like.

In the accompaying drawing, Figure 1 is broken side view of an apparatus, in which such valves are used; Fig. 2 is an enlarged longitudinal section of the valve; Fig. 3 is a cross section of the same on the line 3—3 of Fig. 2; Fig. 4 is a side view of the valve detached.

Referring to the drawing, 1 indicates a tank or receiver upon which a cylinder 2 is supported by means of the casings 3 of conduits 4. In said cylinder reciprocate two pistons, not shown, which, by means of cranks, rotate a shaft 5, which passes through a cylinder head 6. The shaft 5 carries a worm 7 which meshes with a worm wheel 8. Through the hub 13 of said worm wheel passes loosely a shaft 9, to which are attached two collars 10, 10' formed with clutch faces 11, 11', adapted to engage clutch faces 12, 12', on the ends of the hub 13 of the worm wheel 8. Consequently, when either of said clutches secured to the shaft engages one of the clutch faces 12, 12', the shaft is rotated with the worm wheel. The shaft 9 is adapted to be moved longitudinally by the forked lower end of a lever 14, pivoted upon an arm 15 secured upon a valve casing 16 on the right, said lower end engaging a groove 17 of said collar 10' on the right. The shaft is also adapted to be rotated by means of a hand wheel 18 secured upon the collar 10' on the left. Each end of the shaft is formed with a feather 21 which slides in a groove 22 in a cylindrical recess 23 formed in a rotary valve 24, so that both of said valves turn with said shaft. Each valve is formed with a head 25, which closes one end of the valve casing, and with a cylindrical portion 26 which fits in the other end thereof, said head and cylindrical portion being spaced from each other opposite to a discharge port 27 (Figs. 1 and 2). The cylindrical portion 26 of each valve is crossed by a diametral web 28 and is formed on opposite sides of said web with two ports 29, 30. Also, formed integral with the web at its outer end is a half head 31. Consequently the compartment on one side of said web, and one of said ports 29, are in communication with the outer end of the valve, while the compartment on the other side of said web and the other port 30 are in communication with the intermediate space between the cylindrical portion 26 of the valve and the head 25 thereof, and opposite to the port 27. Each valve rotates in a cylindrical shell 33, which has a port 34 on its inner side near one end opening to a passage 35 leading to the corresponding end of the main cylinder 2, and on the opposite side is formed near the other end with a small opening 36 opposite to the discharge port 27, and also opposite to the space between the head 25 of the valve and the cylindrical portion 26 thereof. The valve casing is closed at the outer end by a concave head 37 which forms a passage connecting with the conduit 4 leading to the tank 1.

It will be seen that the port 30 can only be connected with exhaust, while the port 29 can only be connected with the tank. Also the gearing is such that the valve makes a complete turn with each complete reciprocation of the piston in the main cylinder.

In the normal operation of the machine the shaft 9, which rotates the valves, is so arranged that, when the piston at either end is withdrawing from the corresponding end of the cylinder, and suction is being thereby created, the passage 35 and port 34 are connected with the port 30, and therefore with the tank, producing suction in the tank. When the piston begins its return movement, toward the same end of the cylinder, the port 30 is disconnected from the passage 35 and the port 29 is connected thereto, so that the air which has been drawn into the cylinder is now forced out to exhaust. Suction takes place in the tank from opposite ends alternately, thus producing a substantially constant suction of the tank. Should it be desired to compress the air in the tank instead of produce suction therein, the shaft 9 is moved part way to the right, so as to release the clutch 10 on the right; the shaft 9 is then given a half turn by means of the hand wheel 18, and the movement of the shaft to the right by the lever 14 is continued, thereby causing the clutch 10' on the left to engage the clutch on the worm wheel, so that the shaft 9 continues to be rotated in the same direction as before, but with the difference that, at the time when the port 30 was formerly connected with the tank, the port 29 is now connected therewith, producing compression in the tank instead of suction therein.

I claim:—

1. A rotary valve having at one end a completely closed head and at the other end a cylindrical portion having opposite ports, a web between the two ports separating said end into compartments, and an intermediate part connected with one end of said compartments, substantially as described.

2. In combination with a cylindrical casing having in its cylindrical portion apertures near the respective ends, a rotary valve in said casing having at one end a central web dividing said end into compartments, and having ports on opposite sides of said web, either of which can register with the aperture near the corresponding end of the casing and also having an intermediate portion, the whole of which is in communication with the aperture near the other end of the casing, and which is also in communication with one of said compartments, substantially as described.

3. The combination of a rotary valve having a central web dividing the same into compartments, conduits exclusively in communication with the respective compartments, a cylinder adapted to be connected with either compartment, a shaft, means for rotating the shaft with the movement of the piston in the cylinder, and means for independently rotating the shaft, substantially as described.

4. The combination of a pair of valves each of which has a central web dividing the same into compartments, conduits exclusively in communication with the respective compartments, a cylinder adapted to be connected with either compartment, a shaft connected to both of said valves, means for rotating the shaft with the movement of the piston in the cylinder, and means for independently rotating the shaft, substantially as described.

In testimony whereof I have hereunto set my hand in the presence of two subscribing witnesses.

ALBERT E. MOORHEAD.

Witnesses:
 FRANCIS M. WRIGHT,
 D. B. RICHARDS.

Copies of this patent may be obtained for five cents each, by addressing the "Commissioner of Patents, Washington, D. C."